A. E. REITZEL.
COW PEA HARVESTER.
APPLICATION FILED SEPT. 10, 1915.

1,280,842.

Patented Oct. 8, 1918.
7 SHEETS—SHEET 3.

WITNESSES:
John B. Schrott
Myron G. Clear

INVENTOR
Albert E. Reitzel
BY Munn & Co.
ATTORNEYS

UNITED STATES PATENT OFFICE.

ALBERT E. REITZEL, OF WASHINGTON, DISTRICT OF COLUMBIA.

COW-PEA HARVESTER.

1,280,842.  Specification of Letters Patent.  Patented Oct. 8, 1918.

Application filed September 10, 1915. Serial No. 49,939.

*To all whom it may concern:*

Be it known that I, ALBERT E. REITZEL, a citizen of the United States, and a resident of the city of Washington, in the District of Columbia, have invented a certain new and useful Improvement in Cow-Pea Harvesters, of which the following is a specification.

My present invention relates to cow pea harvesters of that type attachable to mowing machines, and more particularly to one which derives its power from that developed by the traction wheels of the mowing machine to which it is attached.

The primary object of my invention is to provide a simple, inexpensive machine by which cow peas may be harvested with but a single operator and without injury to the peas.

Another object of my invention is to provide a flexible machine attachable to the knife bar of a mower, of such a nature that the knife bar may be raised and lowered when desired and with but little greater effort than usually necessary for such movements.

Generally speaking these objects are carried out by means of a frame, the forward portion of which is supported by a bull wheel and the rear portion of which is journaled in a line with its longitudinal axis, upon a caster wheel frame having side caster wheels, the harvester mechanism being mounted in a frame attachable to the mower knife bar and having a fulcrum upon the axle of the bull wheel to swing forwardly and rearwardly, the swivel movements of the main frame and the rocking movements of the harvester frame coöperating to permit of the necessary flexing of the mower knife bar following inequalities in the soil and the raising and lowering thereof for various reasons.

These objects, together with certain others which will hereinafter appear are, more particularly, carried out by the mechanism shown in the accompanying drawings, referred to in the following description of the several parts thereof, and in which drawings—

Fig. 3 is a vertical longitudinal section taken substantially on line 3—3 of Fig. 2.

Fig. 4 is a horizontal sectional view taken substantially on line 4—4, of Fig. 1 and particularly illustrating the conveyer which carries the threshed peas rearwardly to the receiving car.

Fig. 5 is a detail vertical section taken substantially on line 5—5 of Fig. 4.

Fig. 6 is a similar view taken substantially on line 6—6 of Fig. 4.

Fig. 7 is a horizontal sectional view taken substantially on line 7—7 of Fig. 3, and particularly illustrating the main clutch and the intermediate interchangeable gearing.

Fig. 8 is a detail side view of the clutch operating mechanism.

Fig. 9 is a fragmentary plan view of the front portion of the frame, showing the means for bracing the bull wheel axle against undue strains.

Fig. 28 is a detail section therethrough taken substantially on line 28—28 of Fig. 27, and Fig. 29 is a view illustrating certain bracing connections for the pivoted threshing frame to be hereinafter described.

Figures 1, 10, 11, 12:
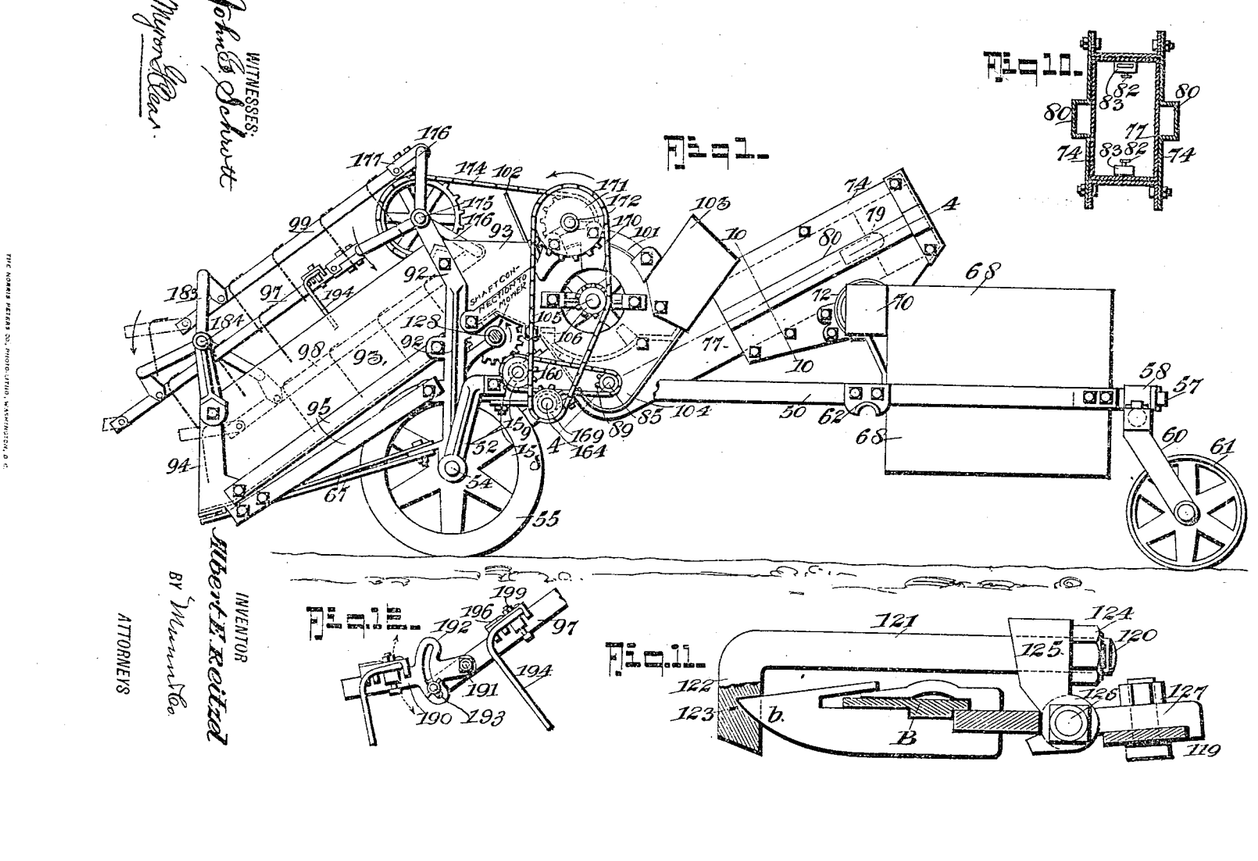
Figure 1 is a side elevation of my complete harvester.
Fig. 10 is a detail section taken substantially on line 10—10 of Fig. 1.
Fig. 11 is an enlarged detail section through one of the cutter bar clamps, taken substantially on line 11—11 of Fig. 2.
Fig. 12 is a detail side elevation of the forward adjustable end of the rake bars.
Figures 13, 14, 15:
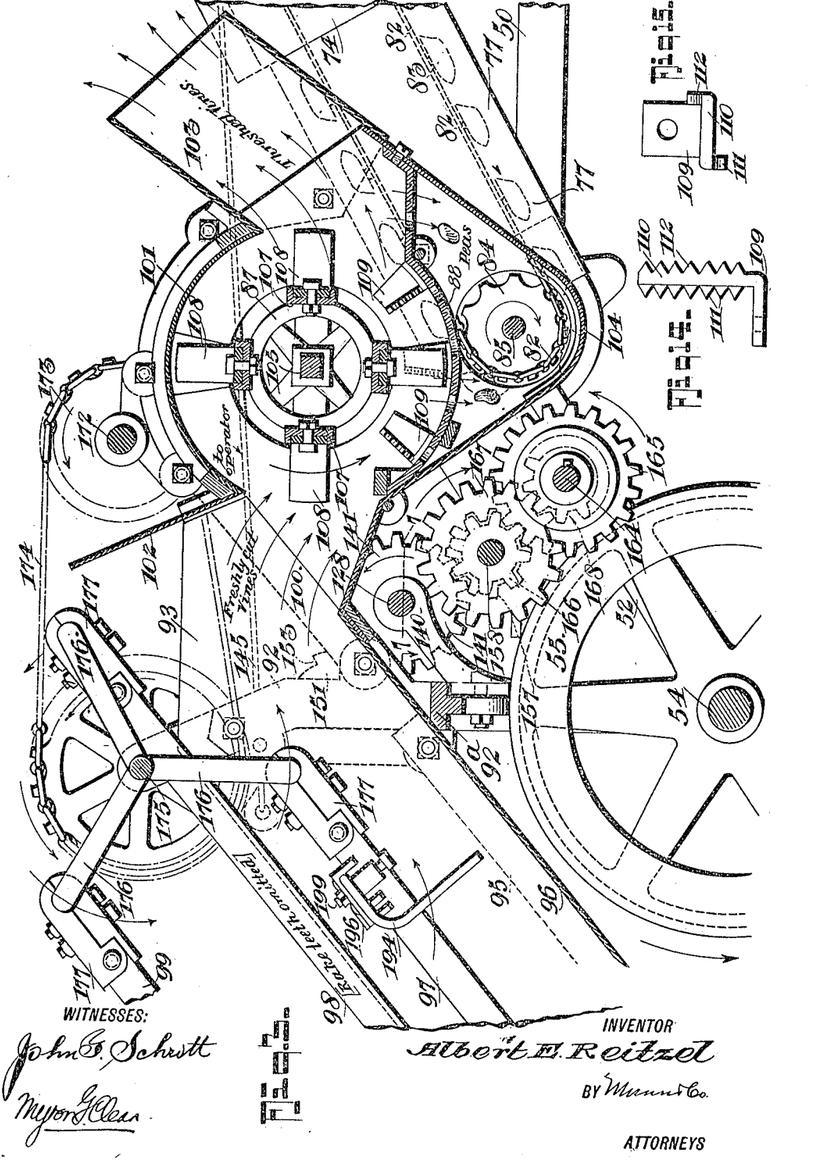
Fig. 13 is a detail plan view of the clutch operating mechanism looking in the direction of the arrow *x* in Fig. 8.
Figs. 14 and 15 are respectively a side and plan view of one of the threshing cylinder teeth removed.
Figures 13, 14, 15, 16:
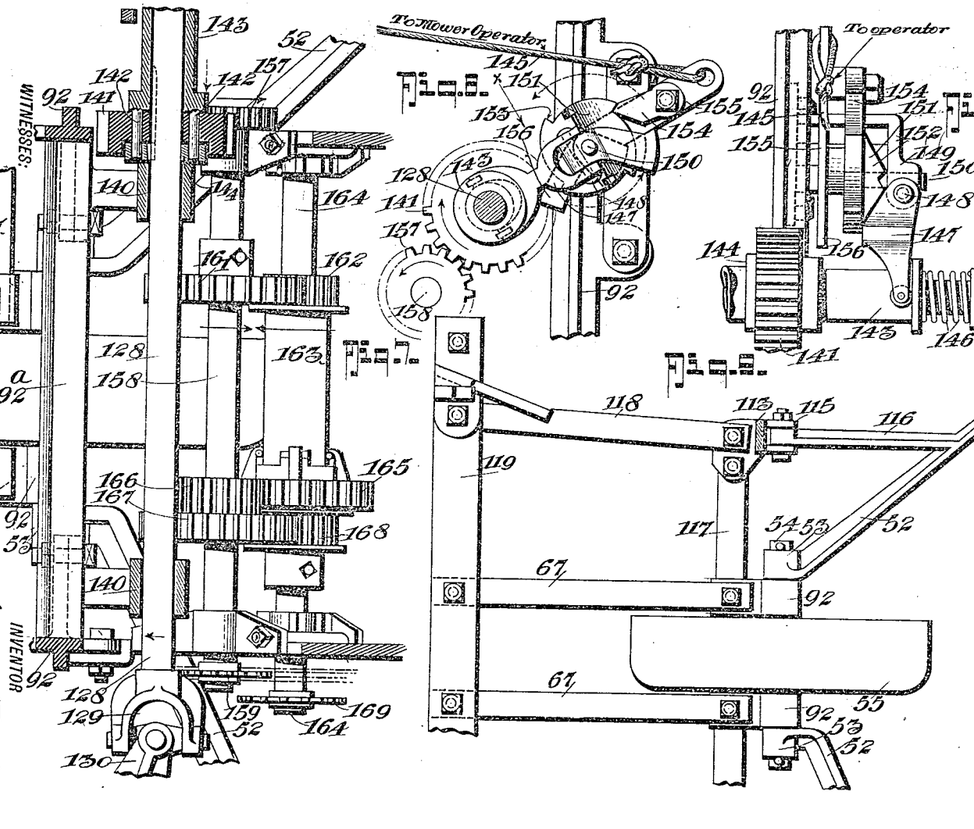
Fig. 16 is a side view of the main frame stripped and rigged for transportation independent of the mower.

Referring now to these figures and more particularly to Figs. 1, 4, and 16, the main frame of my improved machine, which is generally rectangular, consists of side bars 50 having rear inwardly bent ends 51 and forward inwardly and downwardly bent ends 52, these latter having bearings 53 at their extremities supporting the shaft 54 of the forward central bull wheel 55.

The rear ends 51 connect to the ends of a cross piece 56 having a central rearwardly extending trunnion 57 mounted in a bearing 58 at the center of the cross bar 59 of a caster frame, the ends of which bar 59 swively support forks 60 of caster wheels 61. The main frame is thus free to turn on its longitudinal axis.

Figures 15, 16, 17, 18, 19, 20, 21:
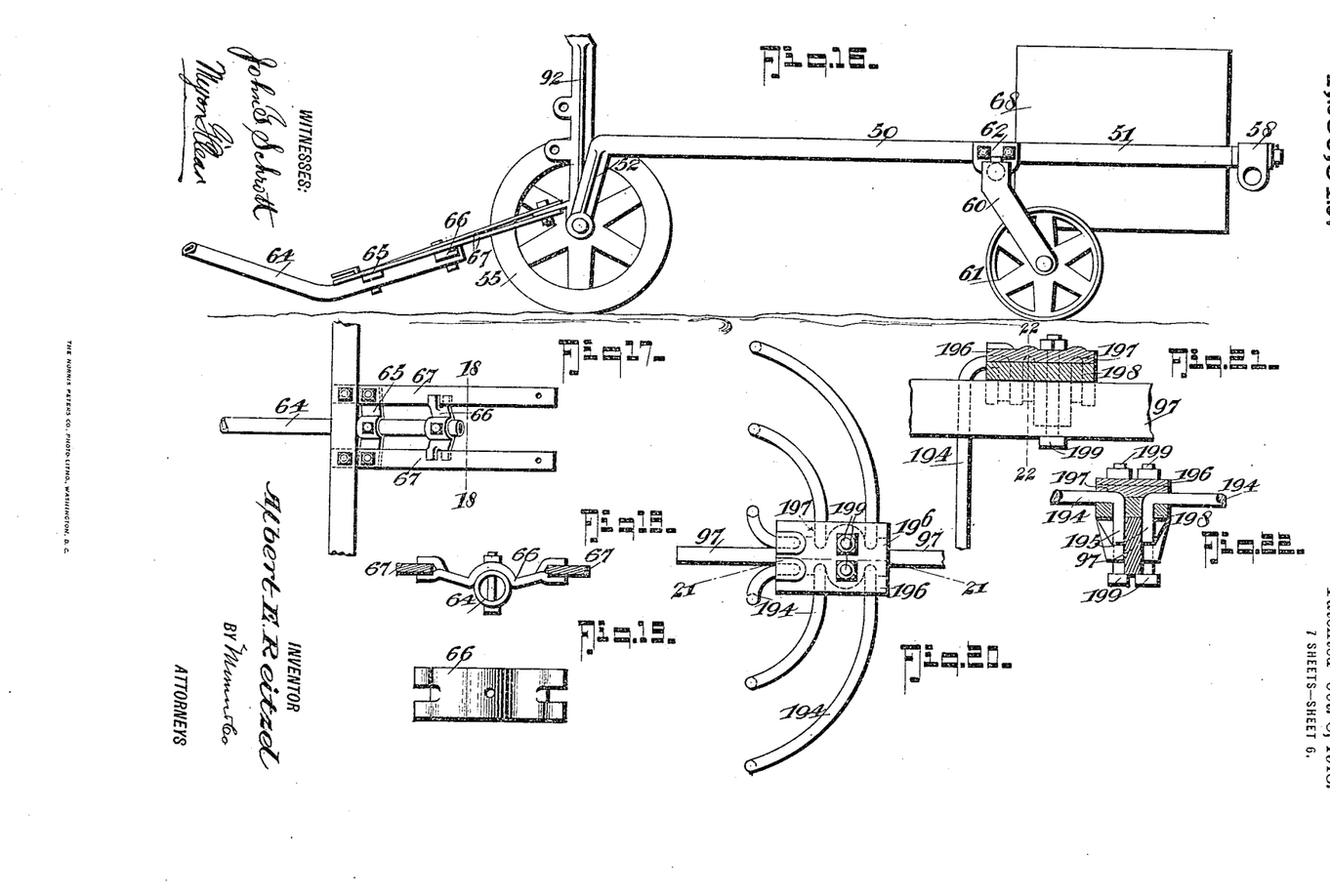
Fig. 17 is a detail plan view of the tongue connection in Fig. 16.
Fig. 18 is a cross section taken substantially on line 18—18 of Fig. 17.
Fig. 19 is a detail plan view of one of the cross pieces shown in Fig. 17.
Fig. 20 is a plan view of a portion of one of the rake bars at the point of connection of a cluster of rake teeth.
Fig. 21 is a detail section therethrough taken substantially on line 21—21 of Fig. 20.

As seen in Fig. 16, the bar 59 may be detached from its bearing 58 and adjusted to bearings 62 of the frame forwardly of its cross piece 63 as shown in Fig. 4, in order to support the frame in non-rotative position when transporting the same from place to place, in which event a tongue 64, see Figs. 16 and 17, is detachably connected by members 65 and 66 seen also in Figs. 18 and 19, to parallel forward brace members 67. Ordinarily, however, this tongue is detached and the caster frame is in the position best seen in Figs. 1 and 4.

That portion of the main frame in the rear of its cross bar 63, see Fig. 4, serves to receive and detachably hold a receiving can 68 which ultimately receives the threshed peas, having a forward receiving mouth 69 with which the inner end of a laterally projecting rigid conveying tube 70 communicates. This tube 70, as seen in Fig. 5, has its outer open end supported by a bracket 71 attached to crossbar 63, and is there provided with a ring 72 telescoping a ring 73 carried by the rear laterally opening end of the rear section 74 of a longitudinal side conveyer tube, which section 74 may thus swing vertically by means of rings 72 and 73 and a pivotal connection at 75 with a portion of bracket 71, and is provided with a forward open end as best shown in Fig. 4, and with side guides 76 on which the rear open end of the forward section 77 of this conveyer tube slides.

At the rear end of the forward section 77 of the tube above mentioned, a transverse shaft 78 is supported by side blocks 79, these latter sliding in grooves 80 of the section 74 as best seen in Fig. 10, said shaft 78 carrying a central sprocket wheel 81, see Fig. 4, upon which travels the rear end of the endless chain 82 of a bucket conveyer, the buckets of which are shown at 83.

The forward end of chain 82 is driven by means of a sprocket 84 at the lower forward end of the forward section 77, said sprocket wheel 84 being secured upon a laterally extending shaft 85 projecting through the lateral opening 86 of section 77 and through the lower portion of the casing of the threshing cylinder 87 below its apertured concave 88, as seen in Fig. 3. Shaft 85 carries a sprocket wheel 89 at its opposite end as seen in Fig. 1.

Referring again to Fig. 4, however, it will be seen that the lower end of the forward section 77 of the conveyer tube is connected to one side of the threshing cylinder by means of rings 90 and 91, thus forming a swivel joint which, with the swivel joint formed by the rings 72 and 73 at the upper rear end of the rear section 74, will permit of sliding adjustment of the sections of the conveyer tube with respect to one another.

The casing of the threshing cylinder 87 forms part of the threshing frame substantially balanced above the bull wheel 55 and having intermediate vertical side bars 92 connected by an intermediate cross piece 92ª and the lower ends of which are journaled on the shaft 54 of said wheel, so as to enable the said frame to swing forwardly and rearwardly as may be desired or necessary, for the purpose to be hereinafter described.

The side plates 93 of the pivoted threshing frame are bolted securely to the intermediate side bars 92 and to lower forward vertical bars 94 which latter are braced by inclined bars 95 connecting the same with the bars 92. The side plates 93 thus form the sides of the casing of the threshing cylinder 87 rearwardly of bars 92 and also of the forwardly and downwardly extending vine rake pan 96 resting on cross piece 92ᵃ and in which rake bars 97, 98, and 99 operate to draw the pea-laden vines upwardly into the mouth 100 of the threshing cylinder as clearly indicated by the arrows showing the direction of movement of the vines in Fig. 3.

The casing of the threshing cylinder 87 also has a top 101 at the forward portion of which is an inclined deflector plate 102 for the upwardly moving vines, a rear upwardly inclined and rearwardly opening vine outlet 103 for the threshed vines, and a base 104 below the concave 88 upon which the threshed peas are agitated into the lower end of the forward section 77 of the side conveyer tube as before described.

The threshing cylinder itself consists of a central shaft 105, at one outer end of which is a sprocket wheel 106, a pair of spiders secured to the shaft, and a plurality of longitudinal peripheral channel bars 107, the channels of which form seats for the radially projecting teeth 108 which latter, it will be noted, have smooth unbroken edges and are designed to travel between spaced projecting concave teeth 109 each of which has an angular upstanding portion 110 as best seen in Figs. 14 and 15 provided with oppositely projecting serrated angular edges 111 and 112.

As shown in Figs. 9 and 29, the threshing frame which is tiltable forwardly and rearwardly as before described, may have at one side an outer short inclined upright 113 bolted at its upper end at 114 to the uprights 92 and pivotally connected at its lower end in the plane of the bull wheel shaft 54, at 115 to the forward ends of forward extensions 116 of the forward portions 52 of the main frame side bars 50. Lateral braces 117 connect the lower ends of bars 92 and 113 as seen in Fig. 9, and the lower ends of bars 113 are also connected by longitudinal braces 118 with the forward transverse bar 119 of the threshing frame, these latter braces being outside the braces 67 before described, the forward ends of which are also connected to the bar 119.

Figure 2:
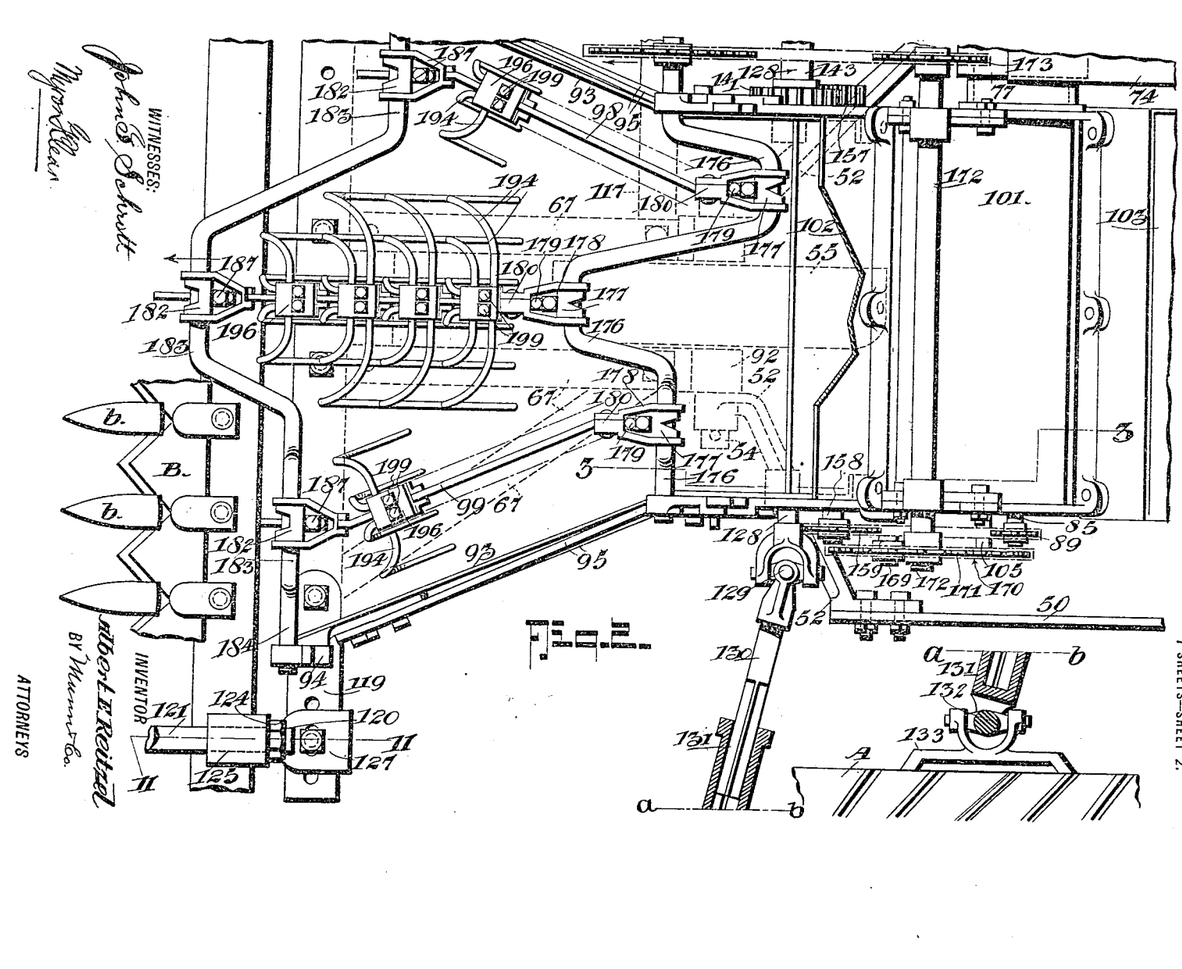
Fig. 2 is a fragmentary plan view of the front end of the harvester showing, more particularly, the crank arrangement for operating the vine rakes.

The forward transverse bar 119 just mentioned and to which the lower forward end of the vine pan 96 is connected, carries clamps 120 for engagement with the cutter bar of a mowing machine in connection with which my improved machine is adapted for operation, the main wheel A and cutter bar B of which are shown in Fig 2, the cutter bar B with the details of one of the clamps 120 appearing again in Fig. 11. Referring to this latter figure, each of the clamps consists of an angle bolt 121, the forward downturned end 122 of which has a recess 123 for the reception of one of the guard fingers b and the rear threaded end of which is secured by a nut 124 through the upstanding portion of a member 125 abutting the heel of the cutter bar B and connected by a bolt 126 to a plate 127 bolted to the bar 119. Thus the several parts of each clamp may be adjusted to firmly and evenly engage the cutter bar B without danger of displacement.

Figures 21, 23, 24, 25, 26, 27:
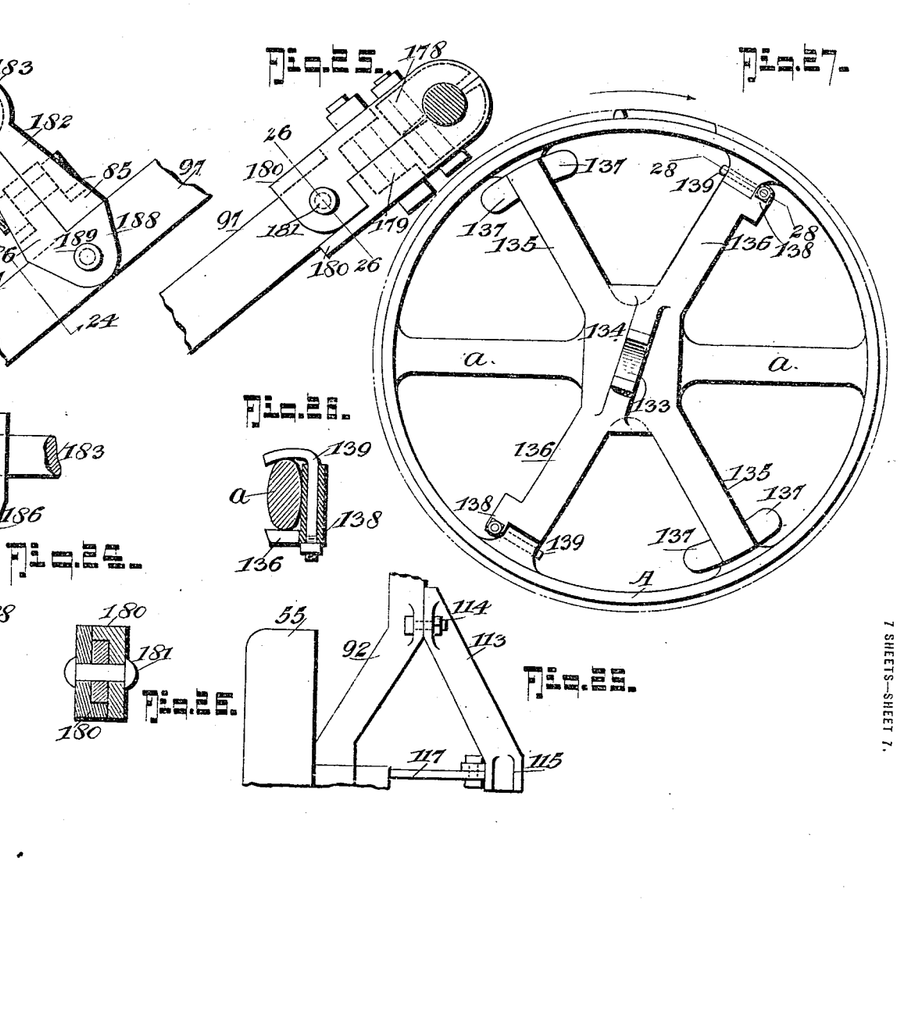
Fig. 23 is a side view of one of the rake bar connections with the lower forward crank shaft.
Fig. 24 is a detail section taken therethrough substantially on line 24—24 of Fig. 23.
Fig. 25 is a side view of one of the rake bar connections with the upper rear crank shaft.
Fig. 26 is a detail section taken therethrough substantially on line 26—26 of Fig. 25.
Fig. 27 is a side view of one of the mower traction wheels, particularly illustrating my improved clamp attachable thereto.

The threshing frame carries a main shaft 128, one end of which has a universal connection 129 with a squared connecting bar 130 slidably disposed in a second connecting bar 131 having a squared socket receiving the same. One end of the socket bar 131 also has a universal connection 132 with a clamping member 133 for engagement with one traction wheel A of a mowing machine, the details of which clamp are shown in Figs. 27 and 28. Referring to these latter figures, the clamping plate 134 has oppositely extending pairs of arms 135 and 136 so disposed in angular relation as to coincide with certain of the spokes a of the mowing machine A without regard to the particular number of such spokes which vary among the products of different manufacturers. The arms 135 have lateral extensions 137 at their outer ends adapted to engage the respective spokes a while the arms 136 each have a single lateral extension 138 at its outer end projecting at one side of the respective spoke a and carrying an extending angle bolt 139 between which and the extension 138 the respective bolt is securely engaged.

Thus, during operation of the mowing machine, my improved machine, connected thereto as described, and traveling alongside the same, receives power at shaft 128 which shaft, as best seen in Fig. 7, is journaled in bearings 140 in the threshing frame and is provided with a loose gear 141 provided with apertures in which work pins 142 carried by the inner end of a sleeve 143 splined on the shaft and which pins are projectable by inward sliding movement of the sleeve 143, into apertures in a stationary disk 144 rigidly secured to shaft 128 at the relatively opposite side of gear 141, thus forming a clutch which, through the improved means shown in Figs. 8 and 13 may be controlled by a single flexible connection 145 leading to the operator of the mowing machine.

The sleeve 143 is thrust inwardly to the clutched position by a spring 146 in Fig. 13 and is engaged by the outer yoke end of a controlling member 147, the inner end of which is pivotally connected at 148 to one portion of a bracket 149 secured to the adjacent upright 92 and supporting a shaft 150 on which is a rotatable actuating member 151 having diametrically opposite raised side portions 152 forming cams and either of which, upon rotative movement of member 151 to engage member 147, throws the latter outwardly forcing sleeve 143 outwardly.

The member 151 has peripheral teeth 153 shown plainly in Fig. 8 constituting a ratchet and engaged by a pawl carried by a lever 155 fulcrumed on the shaft 150 and to the outer end of which the flexible connection 145 is secured. In normal position as shown in Fig. 8, the upper portion of lever 155 rests on bracket 149 and this lever has an inner extension 156 which abuts a portion of the said bracket at the end of its stroke, whereby to limit its movement. Thus each time the operator pulls the connection 145, the member 151 is given a quarter turn in the same direction, the result being to alternately clutch and unclutch gear 141 through the connections described.

Gear 141 is in mesh with a gear 157 at one end of a shaft 158 having at its opposite end a sprocket wheel 159 connected by a sprocket chain 160 to the before mentioned sprocket wheel 89 of the inclined bucket conveyer shaft 85, as best seen by reference to Figs. 1 and 7.

Shaft 158 also has an intermediate gear 161 secured thereon as shown in Fig. 7, meshing with a gear 162 at one end of a sleeve 163 loosely disposed on a shaft 164, and at the opposite end of which sleeve is secured a gear 165 in mesh with a gear 166 loose on shaft 158 but secured to a gear 167 thereon in mesh with a gear 168 secured on the said shaft 164, gears 161, 165, and 167 being large gears and gears 162, 166, and 168 being small gears whereby to form a speed gearing the action of which results in a materially increased speed at shaft 164 at one end of which is a sprocket wheel 169 connected by a sprocket chain 170 to a sprocket wheel 171 secured on the upper counter shaft 172 as shown in Fig. 1 and which chain 170 engages the sprocket wheel 106 before mentioned at one end of the threshing cylinder shaft 105.

The counter shaft 172 has another sprocket wheel 173 as best seen in Fig. 3, connected by a forwardly extending sprocket chain 174 to the upper rake shaft 175 having three 120° cranks 176 engaged by bearings 177 at the upper ends of the rake bars 97, 98, and 99 before mentioned.

These bearings 177, the details of which are shown in Figs. 25 and 26, each include two parts 178 and 179 bolted together by bolts 181 and having recessed outer portions embracing the respective crank and oppositely projecting angular inner portions 180 embracing the upper end of the respective rake bar and bolted thereto by a bolt 181.

Adjacent their lower ends the rake bars are connected by upright bearings 182 to the cranks 183 of the lower crank shaft 184 similar to the upper shaft 175 and its cranks, said bearings 182, like bearings 177, being in two similar parts 185 and 186 as shown in Figs. 23 and 24, the parts of each bearing being connected by bolts 187 to embrace the respective crank at the upper end and having oppositely projecting angular portions 188 at their lower ends embracing the respective rake bar and secured thereto by a bolt 189.

At the extreme lower end of each rake bar is an extension piece 190 pivotally secured at its inner end thereto as at 191, and having an intermediate slotted segment 192 which receives a clamping bolt 193 projecting from the rake bar. Thus the extension may be clamped in selected vertical adjustment.

Figure 22:
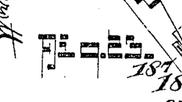
Fig. 22 is a similar view taken substantially on line 22—22 of Fig. 21.

The rake teeth 194 each of which consists of a rod having an outer downwardly bent free end and an inner upper end provided with a depending extension 195, are secured in groups along the rake bars and their extensions 190 by means of clamps 196, the details of which are shown in Figs. 20, 21, and 22, it being noted that the teeth 194 are of various lengths in the several groups so as to spread more or less from the rake bars, as clearly seen in Fig. 2, and thus take up the space above the rake pan 96 and effectively elevate the pea laden vines to the threshing cylinder.

Each of the clamps 196 includes upper and lower plates 197 and 198 having in their inner abutting faces grooves coöperating to form channels for the upper inner ends of the teeth 194, the lower plate 198 having vertical openings which receive the teeth extensions 195. The two plates 197 and 198 are connected together and to the rake bar by means of spaced bolts 199, the lower heads of which engage the rake bar as shown particularly in Fig. 22.

Thus in operation with the clutch as described, engaged by the operator, the rake bars are actuated to feed the vines up the rake pan which were just previously cut by the mowing machine, the cutter bar of which is followed by my improved machine. At the same time, the threshing cylinder is rotated to thresh the peas from the vines in the manner described and the vines discharged as previously mentioned, the threshed peas falling through the cylinder concave and being agitated into the lower portion of the inclined side elevator by which they are carried upwardly and agitated laterally into the receiving can 68 which latter may be exchanged for an empty can when filled.

Throughout this operation and at any time during the same, the cutter bar of the mowing machine may be raised, the tilting movement of the threshing frame and the swinging movement of the main frame, of my improved machine, permitting this to be done without greatly increased effort on the part of the operator. Upon such a movement, the relative change of positions of the main frame and threshing frame, is taken up by the telescoping movements of the upper and lower sections of the bucket conveyer and the relative change of the entire machine with respect to the mowing machine is taken up by the joints 129 and 132 and the sliding bar 130 and socket 131.

A machine of this character thus attachable to various mowing machines, is particularly desirable for harvesting cow peas and will be comparatively simple and inexpensive in addition to permitting of the usual control of the mowing machine during operation, including the raising of the cutter bar thereof as before stated.

I claim:—

1. A harvester attachable to the cutter bar of a mowing machine, comprising a main frame, a forward central wheel supporting the forward portion of the main frame, a rear caster frame upon which the rear portion of the main frame is centrally journaled to swing laterally, a frame mounted above the forward portion of the main frame and upon said forward wheel to swing forwardly and rearwardly, means carried by the forward portion of said swinging frame for attachment to the cutter bar of a mowing machine, and a threshing mechanism carried by said swinging frame.

2. A harvester attachable to the cutter bar of a mowing machine, comprising a forwardly and rearwardly tiltable frame having a forward inclined rake pan, clamps adjacent the lower end of the said rake pan for attachment to the mowing machine cutter bar, a threshing mechanism carried by said frame and including a threshing cylinder and rake bars operating on the rake pan to feed cut vines to the said cylinder, and a laterally swinging main wheeled frame on which the said tiltable frame is mounted.

3. A harvester, attachable to the cutter bar of a mowing machine, comprising a forwardly and rearwardly tiltable frame, clamps carried by the tiltable frame for attaching said frame to the mowing machine cutter bar, a threshing mechanism carried by said frame, and a main laterally swinging wheeled frame within which said threshing frame is tiltable, having a forward wheel on which the tiltable frame is balanced.

4. A harvester attachable to mowing machines, comprising a forwardly and rearwardly tiltable frame, clamps for attaching said frame to the cutter bar of a mowing machine, a threshing mechanism supported by said frame and including flexible driving connections attachable to one of the traction wheels of the mowing machine, and a main, laterally swinging frame, movable alongside the mowing machine and within which said threshing frame is mounted, and including a single forward wheel on which the threshing frame is tiltable.

5. A harvester attachable to mowing machines, comprising the combination with a mowing machine including traction wheels and a cutter bar, of a main wheel frame movable with, and alongside, the mowing machine adjacent one of its traction wheels and swivelly supported to tilt in a direction, transverse to its line of movement, a forwardly and rearwardly tiltable threshing frame within said main frame and having clamps at its forward end attachable to the cutter bar of the mowing machine, and a threshing mechanism carried by said threshing frame and including driving connections leading, and attachable to the adjacent traction wheel of the mowing machine, said main frame having a single front wheel on which said tiltable frame is balanced.

6. A harvester attachable to mowing machines, comprising a forwardly and rearwardly tiltable frame, means for attaching said frame to the cutter bar of a mowing machine, a rake pan carried by said frame in the rear of the cutter bar, a rake mechanism operating above the rake pan, a threshing cylinder into which the cut vines are raked, having an outlet for the threshed vines, and a laterally swinging main wheeled frame supporting said tilting frame.

7. A harvester attachable to mowing machines, comprising a forwardly and rearwardly tiltable frame, means for attaching the forward portion of said frame to the cutter bar of a mowing machine, a threshing mechanism carried by said frame, a laterally swinging main frame supporting said threshing frame, a receiving can carried by the main frame, and a conveyer for carrying threshed peas from the threshing mechanism to said receiving can and including a pair of sections slidably adjustable with respect to one another, one of said sections having a swiveled connection with the threshing frame and the other section having a swivled connection with the main frame.

8. A harvester attachable to a mowing machine, comprising a clamp for engagement with the mowing machine cutter bar, including a rigid bracket, an upright clamping piece pivotally connected to said bracket and engageable with the rear edge of the cutter bar, and an angle bolt secured through the upper part of said clamping piece and having its outer downturned end provided with a recess for the reception of one of the guard fingers of the cutter bar.

9. A harvester of the character described, comprising a main rectangular frame having inturned downwardly inclined forward portions, a rear caster wheel frame upon which the main frame has a rear central bearing permitting the same to swing laterally, a bull wheel supporting the forward portion of said main frame, and having its axle journaled through the said forward frame portions, a threshing frame above the main frame and having side bars journaled at their lower ends upon the axle of the bull wheel, to permit said threshing frame to swing forwardly and rearwardly, and a threshing mechanism carried by said threshing frame.

10. A harvester of the character described, comprising a main frame, a bull wheel supporting the forward portion of the main frame, a rear caster frame including a cross bar upon which the rear portion of the main frame has a central detachable bearing, to permit the frame to swing laterally, said bearings carried by the sides of the main frame for the reception of the cross bar of the caster frame when detached from the rear of the main frame to permit the latter to be transported from place to place, a forwardly and rearwardly tiltable threshing frame above the main frame and attachable to a mowing machine, and a threshing mechanism carried by said threshing frame.

11. A harvester attachable to mowing machines, comprising a forwardly and rearwardly tiltable frame, means for attaching the forward portion of said frame to the cutter-bar of a mowing machine, a threshing mechanism carried by said frame, a laterally swinging main frame supporting said threshing frame, a receiving can carried by said main frame, and a conveyer for carrying threshed peas from the threshing mechanism to said receiving can, including a pair of sections slidably adjustable with respect to one another and having operative connections with the threshing frame and the main frame.

12. A harvester attachable to mowing machines, comprising a forwardly and rearwardly tiltable frame, means for attaching said frame to the cutter bar of a mowing machine, a rake pan carried by said frame in the rear of the cutter bar, a rake mechanism operating above the rake pan, a threshing cylinder into which the cut vines are raked, having an outlet for the threshed vines, and a support for said tiltable frame including a bull wheel below said frame and to which the latter is connected and a frame at the forward portion of which said bull wheel is mounted, said last named frame having a laterally swinging movement.

13. A harvester attachable to mowing machines, comprising a forwardly and rearwardly tiltable frame, means for attaching said frame to the cutter bar of a mowing machine, a rake pan carried by said frame in the rear of the cutter bar, a rake mechanism operating above the rake pan, a threshing cylinder into which the cut vines are raked, having an outlet for the threshed vines, and a supporting bull wheel centrally below said tiltable threshing frame and on which the latter is balanced and a laterally swinging frame at the forward end of which said wheel is mounted.

14. A harvester attachable to mowing machines, comprising a forwardly and rearwardly tiltable frame, means at the forward portion of said frame for attaching the same to the cutter bar of a mowing machine, a threshing mechanism carried by the said frame, means for feeding the cut vines to the said threshing mechanism, a single bull wheel disposed centrally of and beneath said tiltable frame and on which the latter is mounted, a frame at the forward end of which said bull wheel is mounted and a wheeled caster movably supporting the rear end of said last named frame to permit the latter to swing laterally.

ALBERT E. REITZEL.

Copies of this patent may be obtained for five cents each, by addressing the "Commissioner of Patents, Washington, D. C."